J. A. Alley
Plow

No. 74267                    Patented Feb. 11, 1868.

Witnesses
W. C. Ashkettle
Theo Fusche

Inventor
J. A. Alley
per Munn & Co.
Attorneys

United States Patent Office.

J. A. ALLEY, OF CLIFTY, INDIANA.

Letters Patent No. 74,267, dated February 11, 1868.

IMPROVEMENT IN COMBINED PLOUGH AND ROLLERS.

The Schedule referred to in these Letters Patent and making part of the same.

TO ALL WHOM IT MAY CONCERN:

Be it known that I, J. A. ALLEY, of Clifty, in the county of Decatur, and State of Indiana, have invented a new and useful Improvement in Combined Plough and Rollers; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish an improved combined plough and roller, which shall be cheap, simple in construction, and effective in operation; and it consists in the construction, combination, and arrangement of the various parts, as hereinafter more fully described.

Figure 1:
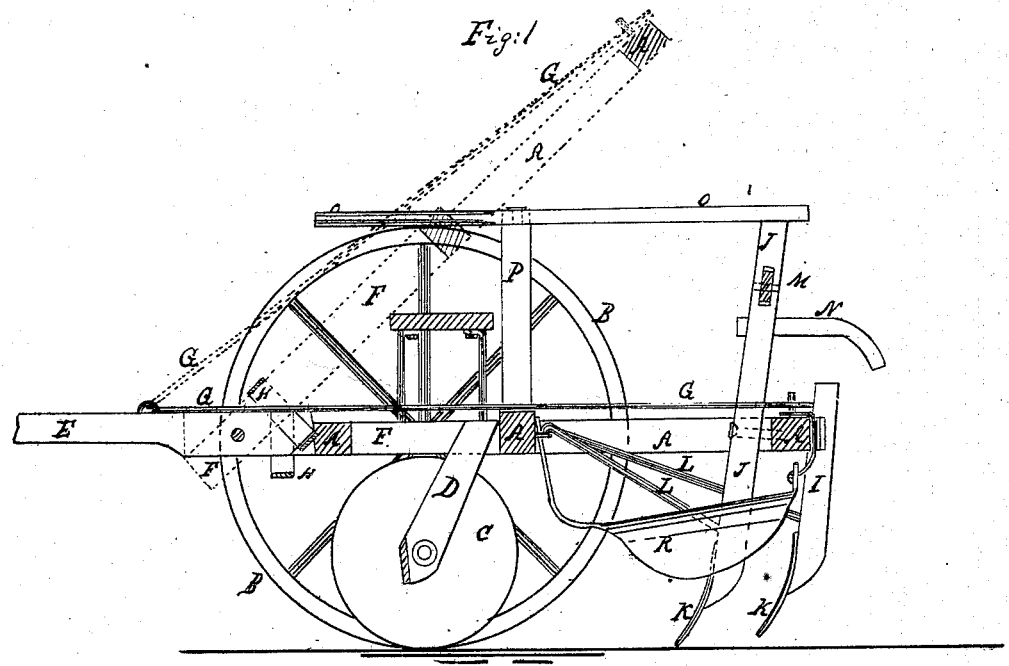
Figure 1 is a vertical longitudinal section of my improved machine, taken through the line $x$ $x$, fig. 2.
Figure 2:
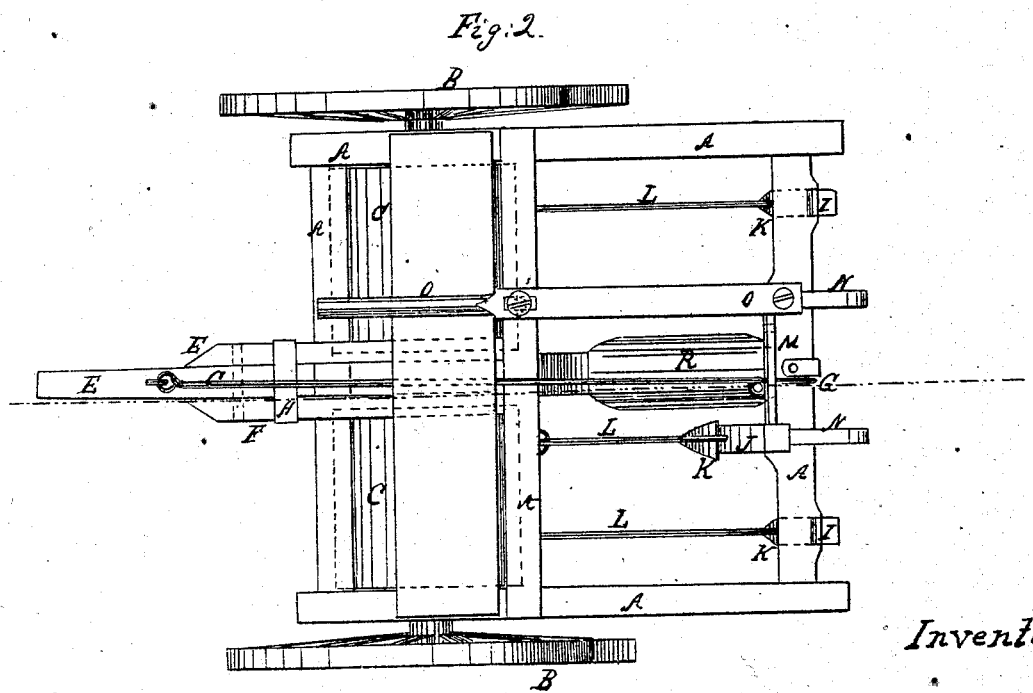
Figure 2 is a top or plan view of the same.

A is the frame, consisting of two longitudinal side bars and three cross-bars. To the side of the forward part of the frame A are attached axles for the reception of the wheels B, which I prefer to make about four feet in diameter. C are two rollers, about two feet in diameter and about twenty-two inches long. The journals of the rollers C revolve in bearings in the supports D attached to the forward part of the frame A, and which are of such a length that the rollers C may be wholly beneath the said frame A, and in such a way that the inner or adjacent ends of said rollers may be at such a distance apart that the plants may pass between them without being crushed or injured by said rollers. E is the tongue, which is pivoted to the hounds F, as shown in figs. 1 and 2, so that the rear part of the frame A may be moved freely up and down. This construction enables the rear part of the frame A to be easily raised to pass over obstructions, or for convenience in turning, or in passing from place to place. G is a rod or bar, the forward end of which is pivoted to the tongue E, a little in front of the hounds F. The rear part of the rod or bar G has one or more holes formed in it, which, when the rear part of the frame A is raised, catch upon a pin or catch attached to the rear cross-bar of the frame A, so as to hold the said frame securely as long as may be required. The rear part of the frame A is kept from being raised too far, or from dropping down too low, by the band H which passes around the hounds F a little in the rear of the pin or bolt by which the tongue E is pivoted to said hounds. The rear end of the tongue E is bevelled off, so that when the rear part of the frame A has been raised to a sufficient height the said bevel may strike against the lower part of the said band, as shown in red in fig. 1, and be prevented from being raised any higher. I are the outer plough-standards, and J are the inner plough-standards, to the lower ends of which the ploughs K are attached, which said ploughs may be shovel-ploughs or side ploughs, as may be desired. The plough-standards I are short, and their upper ends are rigidly attached to the rear side of the rear cross-bar of the frame A, near its ends. The plough-standards J are made long, so as to project above the frame A, and they are pivoted to the front side of the rear cross-bar of the frame A, so that they may work in advance of the standards I, and so that they may be moved from side to side or guided to avoid irregular hills or pass around bends or curves in the row. The plough-standards I and J are connected to the central cross-bar of the frame A by the brace-rods L, by which the greater part of the draught-strain is sustained. The upper ends of the standards J are connected to each other by the cross-bar M, the ends of which are pivoted in slots in the said standards, so as to work freely as the standards are moved from side to side. One or both the ends of the bar M have two or more holes formed through them for the reception of the pins or bolts, by which they are pivoted to the standards J, so that the said standards may be adjusted for their ploughs to run at a greater or less distance apart, as may be desired. To the rear sides of the upper parts of the standards J are attached handles N, by which the said standards may be guided when the driver walks in the rear of the machine. To the upper end of one of the standards J is pivoted the rear end of the lever O, the forward end of which extends forward, so as to be reached and operated to guide the central ploughs by the driver from his seat. The lever O is pivoted to the upper end of a support, P, attached to the frame A, the pivoting-pin or bolt passing through a slot in the said lever to allow it to move freely in guiding the ploughs. R is a saddle-shaped shield, suspended at its rear and forward ends from the rear and central cross-bars of the frame A, in such a position that it may hang between the inner plough-standards J, allowing the plants to pass between its wings, and guarding the said plants from being injured by having clods, &c., thrown against them by the ploughs.

When the driver is riding, and wishes to raise the rear part of the machine, he has simply to step forward upon the front part of the frame A, which raises the rear part of the machine, and holds it suspended until his weight is removed by passing back to his seat.

I claim as new, and desire to secure by Letters Patent—

1. The combination and arrangement of the short rollers C, frame A, rigid plough-standards I, and pivoted plough-standards J, with each other, substantially as herein shown and described and for the purpose set forth.

2. Operating the pivoted plough-standards J to guide the ploughs, by means of a lever, O, pivoted to the upper end of one of the said standards, and to a support, P, attached to the frame A, substantially as herein shown and described.

J. A. ALLEY.

Witnesses:
JOHN H. ALEXANDER,
STEPHEN ALLEY.